(12) United States Patent
Schneider et al.

(10) Patent No.: US 10,451,144 B2
(45) Date of Patent: Oct. 22, 2019

(54) TORSIONAL VIBRATION DAMPER

(71) Applicant: BorgWarner Inc., Auburn Hills, MI (US)

(72) Inventors: Florian Schneider, Heilbad Heiligenstadt (DE); Viren Saxena, Mannheim (DE); Jochen Boelling, Baden-Baden (DE)

(73) Assignee: BorgWarner Inc., Auburn Hills, MI (US)

( * ) Notice: Subject to any disclaimer, the term of this patent is extended or adjusted under 35 U.S.C. 154(b) by 2 days.

(21) Appl. No.: 15/113,085

(22) PCT Filed: Jan. 21, 2015

(86) PCT No.: PCT/US2015/012175
§ 371 (c)(1),
(2) Date: Jul. 21, 2016

(87) PCT Pub. No.: WO2015/112550
PCT Pub. Date: Jul. 30, 2015

(65) Prior Publication Data
US 2017/0002894 A1  Jan. 5, 2017

(30) Foreign Application Priority Data

Jan. 25, 2014  (DE) .................. 10 2014 001 016

(51) Int. Cl.
*F16D 3/12* (2006.01)
*F16F 15/133* (2006.01)
(Continued)

(52) U.S. Cl.
CPC ............ *F16F 15/1333* (2013.01); *F16D 3/12* (2013.01); *F16F 15/134* (2013.01);
(Continued)

(58) Field of Classification Search
CPC ............. F16F 15/1333; F16F 15/13157; F16F 15/134; F16F 15/1428; F16F 15/1471; F16D 3/12
See application file for complete search history.

(56) References Cited

U.S. PATENT DOCUMENTS 747,250 A * 12/1903 Smith ................ F16D 3/12
464/62.1
6,601,472 B1  8/2003 Baron
(Continued)

FOREIGN PATENT DOCUMENTS

| JP | 2005299742 A | 10/2005 |
| JP | 2012077810 A | 4/2012 |
| JP | 2012077827 A | 4/2012 |

OTHER PUBLICATIONS

International Search Report and Written Opinion dated May 1, 2015 for International Application No. PCT/US2015/012175: BorgWarner Inc.: 12 pages.

*Primary Examiner* — Vicky A Johnson
(74) *Attorney, Agent, or Firm* — BrooksGroup (57) ABSTRACT

A number of variations may include a torsional vibration damper having an input side, having an output side and having an energy store for the rotationally elastic coupling of the input and output sides in a circumferential direction, wherein, on the input or output side, there is arranged a mass part that is rotatable relative to the input or output side counter to the restoring force of a restoring apparatus.

16 Claims, 7 Drawing Sheets

(51) Int. Cl.
  *F16F 15/131* (2006.01)
  *F16F 15/134* (2006.01)
  *F16F 15/14* (2006.01)

(52) U.S. Cl.
  CPC .... *F16F 15/13157* (2013.01); *F16F 15/1428* (2013.01); *F16F 15/1471* (2013.01)

(56) References Cited

U.S. PATENT DOCUMENTS

| | | | |
|---|---|---|---|
| 2009/0272614 A1* | 11/2009 | Watarai | F16D 3/10 192/70.17 |
| 2010/0210365 A1 | 8/2010 | Schober et al. | |
| 2012/0238368 A1* | 9/2012 | Watarai | F16D 13/64 464/51 |
| 2013/0231195 A1* | 9/2013 | Takenaka | F16F 15/1205 464/66.1 |
| 2015/0053527 A1* | 2/2015 | Oda | F16F 15/134 192/30 V |

* cited by examiner

TORSIONAL VIBRATION DAMPER

This application claims the benefit of PCT Application Serial No. 2015/012175 filed Jan. 21, 2015, and German Patent Application Serial No. DE 102014001016.3 filed Jan. 25, 2014.

The present invention relates to a torsional vibration damper having an input side, having an output side and having an energy store for the rotationally elastic coupling of the input and output sides in a circumferential direction.

From the prior art, torsional vibration dampers are known which have an input side, which can be connected for example to the output side of a drive unit, and an output side, which can be connected for example to a transmission or clutch input side.

Between the input side and the output side there is arranged an energy store which serves for the rotationally elastic coupling of the input and output sides in the circumferential direction for the purpose of dampening torsional vibrations.

The known torsional vibration dampers are well proven, but have room for improvement with regard to their vibration behavior in the event of torque shocks.

It is therefore an object of the present invention to provide a torsional vibration damper which is particularly suitable for dampening torsional vibrations and absorbing torque shocks.

Said object is achieved by means of the features specified in patent claim 1. The subclaims relate to advantageous embodiments of the invention.

The torsional vibration damper according to the invention has an input side. The input side may for example be connectable or connected rotationally conjointly to an output side of a flywheel and/or to an output side of a drive unit, for example of an internal combustion engine. Furthermore, the torsional vibration damper has an output side which may for example be connectable or connected rotationally conjointly to a clutch input side and/or to a transmission input side. Accordingly, the input side preferably has a primary element with primary drivers provided thereon, whereas the output side preferably has a secondary element with secondary driver elements provided thereon. Furthermore, the torsional vibration damper has an energy store between the input and output sides, which energy store serves for the rotationally elastic coupling of the input and output sides in a circumferential direction. The energy store may for example comprise a spring element or multiple spring elements, wherein said spring elements are preferably arranged between the above-mentioned primary and secondary drivers as viewed in the circumferential direction. The spring elements of the energy store may for example be helical springs which particularly preferably have a rectilinear or curved spring axis. On the input side or the output side of the torsional vibration damper, preferably on the output side, there is arranged a mass part which is rotatable relative to the input side or output side and which may also be referred to as inertial part or inertial mass part. Consequently, the mass part is rotatable relative to that side of the torsional vibration damper on which the mass part is arranged, that is to say either relative to the input side or relative to the output side. Here, the mass part is rotatable relative to the input or output side counter to the restoring force of a restoring apparatus, wherein the mass part may be arranged on the input or output side for example via the restoring apparatus. It is also preferable for the restoring apparatus to have at least one spring device which serves for indirectly or directly generating the restoring force. Owing to the mass part which is rotatable relative to the input side or output side, it is possible to realize particularly effective torsional vibration damping by means of the torsional vibration damper, wherein the torsional vibration damper can be of simple and space-saving construction.

In one preferred embodiment of the torsional vibration damper according to the invention, the restoring force acting on the mass part is determined on the basis of a restoring force characteristic curve. In other words, a restoring force acting on the mass part is generated in a manner dependent on the rotational angle of the mass part relative to the input or output side of the torsional vibration damper. In this embodiment, the restoring apparatus is adjustable, preferably in continuously variable fashion, with variation of the restoring force characteristic curve of the restoring force acting on the mass part. Here, a variation of the restoring force characteristic curve is preferably to be understood to mean a variation of the gradient of the restoring force characteristic curve by an adjustment of the restoring apparatus, so as to accordingly increase or decrease the stiffness of the restoring apparatus. Consequently, the torsional vibration damper can, by an adjustment of the restoring apparatus, be adapted to a broad excitation frequency range, such that a torsional vibration damper is provided which can be adapted in flexible fashion to the respectively occurring torque shocks.

In a further preferred embodiment of the torsional vibration damper according to the invention, the restoring apparatus is automatically adjustable. Here, the automatic adjustment of the restoring apparatus is preferably performed as a function of the operating state of an associated internal combustion engine, wherein it is particularly preferable for the rotational speed of the associated internal combustion engine to be used as a characteristic variable for the operating state, as a function of which the automatic adjustment of the restoring apparatus is performed.

In one advantageous embodiment of the torsional vibration damper according to the invention, the restoring apparatus is adjustable automatically into a starting position as a result of deactivation of the internal combustion engine, and adjustable automatically, after the starting of the internal combustion engine, into a position deviating from the starting position. Consequently, in this embodiment, the torsional vibration damper is particularly suitable for use in a motor vehicle with an automatic start-stop facility. Also, in this embodiment, it is preferable for the restoring apparatus to exhibit higher stiffness in the starting position than in the position deviating from the starting position, wherein the restoring apparatus possibly exhibits the highest stiffness in the starting position.

In a particularly advantageous embodiment of the torsional vibration damper according to the invention, the mass part is rotatable relative to the input or output side while maintaining a predetermined radial spacing to the axis of rotation of the input or output side. Consequently, in this embodiment, it is possible for vibrations or movements of the mass part in the radial direction to be prevented, such that compensation of such vibrations or movements of the mass part in the radial direction can be disregarded from a design aspect, which leads to a simplified construction of the torsional vibration damper.

It would basically be possible for the restoring apparatus to have a device for generating an actuating force, for example a spring device, wherein the actuating force of said device acts directly on the mass part such that the actuating force generated likewise constitutes the restoring force acting on the mass part. In a further particularly advantageous embodiment of the torsional vibration damper according to the invention, however, the restoring apparatus has at least one pivotable lever element by means of which an actuating force can be transmitted to the mass part so as to generate the restoring force acting on the mass part. This firstly has the advantage that that device of the restoring apparatus which generates the actuating force, for example a spring device, does not need to act directly on the mass part, and can instead be arranged at some other location on the input or output side of the torsional vibration damper, permitting a space-saving and more flexible arrangement of the device for generating the actuating force. Secondly, owing to the lever element, which is preferably of flexurally rigid or non-flexible form, it is possible for a lever ratio to be set, based on which the restoring force acting on the mass part is greater or smaller than the actuating force generated by a corresponding device of the restoring apparatus. It is accordingly possible for the stiffness of the restoring apparatus to be increased, for example in targeted fashion, beyond the lever ratio of the lever element, without the need for a particularly rigid device for generating the actuating force.

In a particularly preferred embodiment of the torsional vibration damper according to the invention, the lever element is pivotable about an articulation point, which is adjustable and/or displaceable with variation of the lever ratio of the lever element. It is consequently possible in this embodiment, by adjusting and/or displacing the articulation point, for the restoring apparatus to be adjusted in a particularly simple manner, with variation of the restoring force characteristic curve of the restoring force acting on the mass part. It is consequently made possible for the stiffness of the restoring apparatus to be varied in a simple manner by adjusting and/or displacing, that is to say changing, the articulation point of the lever element.

In a further advantageous embodiment of the torsional vibration damper according to the invention, the lever element has a first lever section between an actuating force action point and the articulation point and has a second lever section between the articulation point and a restoring force action point, wherein the length of the first and second lever section can be varied by rotation of the mass part relative to the input or output side, with the lever ratio being substantially maintained. The variation, that is to say elongation or shortening, of the first and second lever sections may in this case be realized in any desired manner; for example, the stated lever sections may for example be of telescopic form. Regardless of the respective design variant, the elongation or shortening of the lever sections makes it possible for the mass part to be rotated relative to the input or output side while maintaining a predetermined radial spacing to the axis of rotation of the input or output side, as has already been indicated above. This embodiment also encompasses design variants in which, owing to the design configuration, in particular in the region of articulation point, actuating force action point and/or restoring force action point, rotation of the mass part relative to the input or output side can result in slight changes in the lever ratio. Such a slight change may arise for example owing to the fact that, during the rotation of the mass part relative to the input or output side, the actuating force action point is moved along a straight line, possibly a straight line parallel to a radial line, whereas the restoring force action point is moved along a circular path around the axis of rotation. In this case, and in other cases, the design should however preferably be configured such that the lever ratio is varied by at most 5%, particular preferably by at most 3% or at most 1%, as a result of rotation of the mass part relative to the input or output side.

In a further preferred embodiment of the torsional vibration damper according to the invention, two of the above-mentioned points, that is to say two points out of articulation point, force action point and restoring force action point, are displaceable relative to the lever element with variation of the lengths of the lever sections. Here, it is preferable if the articulation point on the one hand and the actuating force action point or the restoring force action point on the other hand are displaceable relative to the lever element with variation of the lengths of the lever sections, whereas the remaining point is particularly preferably arranged immovably on the lever element.

In a further advantageous embodiment of the torsional vibration damper according to the invention, the restoring apparatus has as already indicated above a spring device for generating the actuating force.

In a further advantageous embodiment of the torsional vibration damper according to the invention, the spring device for generating the actuating force has a first spring element and a second spring element, which act on the lever element oppositely to one another. In this embodiment, it is preferable for the two spring elements that act on the lever element oppositely to one another to be in the form of compression springs, possibly helical compression springs.

In a further preferred embodiment of the torsional vibration damper according to the invention, the lever element is arranged in an initial position under preload of the first and second spring elements of the spring device. This has the advantage that a particularly high stiffness of the spring device is attained in a rotational angle range of the lever element around the initial position. In this embodiment, it is moreover preferable for the first and second spring element to be preloaded such that they both exert a respective actuating force on the lever element over the maximum rotational angle range of the mass part relative to the input or output side. In this way, increased stiffness of the spring device is ensured over the maximum rotational angle range of the mass part.

In a further preferred embodiment of the torsional vibration damper according to the invention, the first spring element and the second spring element each have a longitudinal axis which is offset radially outward in relation to the axis of rotation of the input or output side. It is ensured in this way that the input and/or output side of the torsional vibration damper can be securely rotationally conjointly connected, in the region of the axis of rotation, to an upstream component, for example to the output side of a flywheel or to the output side of a drive unit, and/or to a downstream component, for example to a clutch input side or to a transmission input side, without the spring elements posing an obstruction. In this context, it has proven to be advantageous for the spring elements, and not only the longitudinal axes thereof, to be spaced apart in the radial direction from the axis of rotation of the input or output side.

In a further advantageous embodiment of the torsional vibration damper according to the invention, the longitudinal axes of the first and second spring elements extend along a common straight line and/or parallel to a radial line of the torsional vibration damper.

In a further preferred embodiment of the torsional vibration damper according to the invention, the first spring element and/or the second spring element is assigned a spring travel limiting means for limiting the spring travel. The spring travel limiting means is preferably designed such that the respective spring element can be prevented from entering a blocked state. In this way, not only is the generation of noise reduced, but the spring element can also be protected against damage. Alternatively or in addition, it is preferable in this embodiment if the maximum rotational angle range of the mass part relative to the input or output side is or can be limited by the spring travel limiting means.

In an alternative embodiment of the torsional vibration damper according to the invention in relation to the embodiment in which the first and second spring elements are preloaded, the lever element is arranged in an initial position without preload of the spring elements that act on the lever element oppositely to one another. Consequently, in this embodiment, there is no increase in the stiffness of the spring device in a region around the initial position, and instead, only one spring element acts in one direction of rotation of the mass part, whereas only the other spring element acts in the other direction of rotation of the mass part.

In a further preferred embodiment of the torsional vibration damper according to the invention, the mass part is arranged outside an accommodating space accommodating the energy store. Said accommodating space may for example be of annular form and surrounded by the input side, preferably the primary element, or by the output side, preferably the secondary element, of the torsional vibration damper.

In a further advantageous embodiment of the torsional vibration damper according to the invention, the mass part is of annular form. In this way, only one mass part has to be provided, wherein owing to the annular form, imbalances are avoided and targeted balancing is rendered superfluous.

In a further advantageous embodiment of the torsional vibration damper according to the invention, the mass part is arranged outside the input or output side in the radial direction in order to permit a space-saving arrangement of said mass part.

The mass part may for example be supportable or supported at the inside directly or indirectly on the input or output side, on the greatest outer diameter of the input or output side, or on the greatest outer diameter of that side of the input or output side which faces toward the mass part. In a further particularly preferred embodiment of the torsional vibration damper according to the invention, at least one support part is provided which is connected rotationally conjointly to the mass part and which, supporting the mass part at the inside in the radial direction, is or can be supported in the region of a diameter which is smaller than the greatest outer diameter of that side of the input or output side which faces outward toward the mass part in the radial direction. In this way, the support or bearing surface is reduced considerably, such that, for example, lower friction forces arise during the rotation of the mass part relative to the input or output side. Moreover, the support in the region of a relatively small diameter simplifies the manufacture of the torsional vibration damper.

In a further advantageous embodiment of the torsional vibration damper according to the invention, the support part is or can be supported at the inside in the radial direction substantially in the region of the same diameter as the input or output side. Here, the support part does not imperatively have to be supported or supportable at the inside in the radial direction at the same diameter as the input or output side, and instead, the diameter at which the support part is or can be supported at the inside in the radial direction may deviate by up to 10% from the diameter at which the input or output side is or can be supported at the inside in the radial direction, that is to say may be as much as 10% greater or smaller than the diameter at which the input or output side is or can be supported at the inside in the radial direction.

In a further preferred embodiment of the torsional vibration damper according to the invention, the support part is of disk-shaped form, in order to firstly ensure reliable support at the inside in the radial direction and secondly ensure a small axial structural length of the support part. It is preferable here for the disk-shaped support part to have cutouts or windows, which may for example be provided so as to form interposed spokes or struts in the support part.

In a further advantageous embodiment of the torsional vibration damper according to the invention, the support part at least partially, preferably over its entire radial extent, has a smaller extent in an axial direction than the mass part.

In a further advantageous embodiment of the torsional vibration damper according to the invention, the support part is arranged between two disks of the input or output side as viewed in the axial direction. It is preferable here for the disks to have cutouts or windows, which may for example be provided so as to form interposed spokes or struts in the disks.

In a further particularly advantageous embodiment of the torsional vibration damper according to the invention, the support by the support part is realized with a spacing between that side of the mass part which points inward in the radial direction and that side of the input or output side which faces outward in the radial direction toward the mass part. Consequently, in this embodiment, there is no need for that side of the mass part which faces inward in the radial direction to be supported on that side of the input or output side which faces outward in the radial direction toward the mass part, such that here, no friction is generated and there is no need for increased manufacturing outlay. In this embodiment, it is moreover preferable if the mass part can be or is supported at the inside in the radial direction exclusively via the support part, so as to eliminate any points of friction with the input or output side and simplify the manufacture of the torsional vibration damper.

In a further advantageous embodiment of the torsional vibration damper according to the invention, the energy store has multiple support shoes or connecting shoes which are rotatable relative to the input or output side and which preferably serve for the support and/or connection of one or more spring elements of the energy store. Said support or connecting shoes may for example be so-called slide shoes, end shoes or the like, which are assigned to the spring elements, for example the helical springs, of the energy store.

In a further particularly preferred embodiment of the torsional vibration damper according to the invention, the restoring apparatus is adjustable into a position, possibly the starting position, in which the restoring apparatus interacts with the mass part, possibly via the support part, and/or with the output or input side while hindering, preferably by frictional contact, or preventing, preferably by positive locking, a rotation of the mass part and/or of the input or output side relative to the output or input side. In this embodiment, it is preferable if a displaceable or adjustable projection, which forms the articulation point, of the restoring apparatus is provided, which projection, in the stated position, interacts in the stated manner with the mass part and/or with the output or input side.

The invention will be explained in more detail below on the basis of an exemplary embodiment and with reference to the appended drawings. In the drawings.

Figure 1:
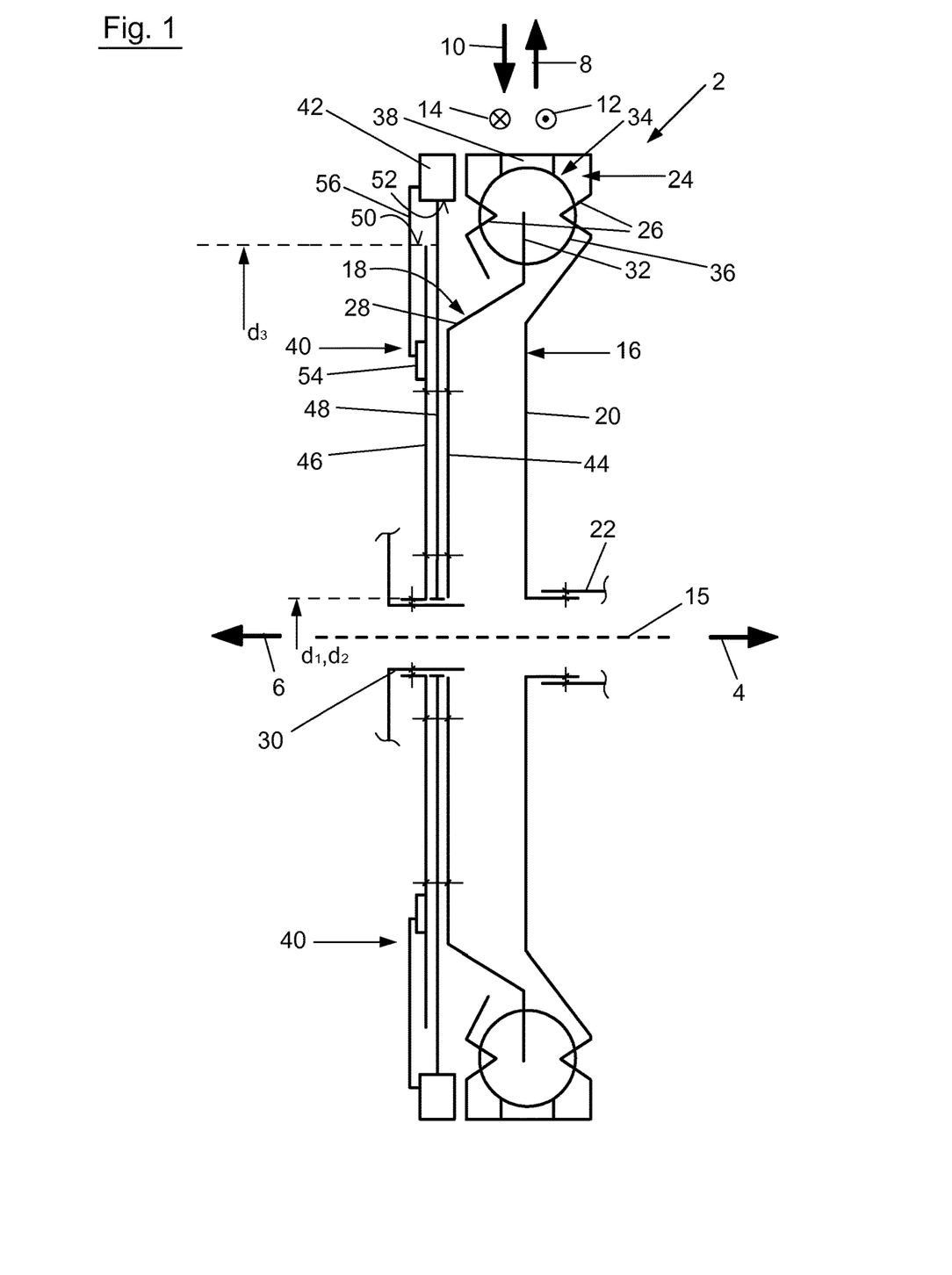
FIG. 1 shows a schematic side view of an embodiment of the torsional vibration damper according to the invention.

FIG. 1 shows a schematic side view of an embodiment of the torsional vibration damper 2 according to the invention. The mutually opposite axial directions 4, 6, the mutually opposite radial directions 8, 10 and the mutually opposite circumferential directions 12, 14 of the torsional vibration damper 2 are indicated on the basis of corresponding arrows. The torsional vibration damper 2 has an axis of rotation 15 extending in an axial direction 4, 6.

The torsional vibration damper 2 has an input side 16 and an output side 18. The input side 16 is formed substantially by a primary element 20 which, to the inside in the radial direction 10, is connected rotationally conjointly to an output hub 22, wherein the output hub 22 is for example the output hub of a flywheel mass (not illustrated in any more detail) or of a drive unit (not illustrated in any more detail), for example of an internal combustion engine. To the outside in the radial direction 8, the input side 16 forms an annular accommodating space 24 which is open inwardly in the radial direction 10 and which is formed in an encircling manner in the circumferential direction 12, 14. On the primary element 20 of the input side 16 there are also provided primary drivers 26 which project into the accommodating space 24.

At the inside in the radial direction 10, the output side 18 of the torsional vibration damper 2, said output side being formed substantially by a secondary element 28, is connected rotationally conjointly to an input hub 30. The input hub 30 may for example be the input hub 30 of a clutch device, preferably of a multiple clutch device, or of a transmission. The secondary element 28 of the output side 18 extends outward in the radial direction 8 into the accommodating space 24, wherein secondary drivers 32 which project into the accommodating space 24 in the radial direction 8 are provided on the secondary element 28.

In the accommodating space 24 there is arranged an energy store 34 for the rotationally elastic coupling of the input and output sides 16, 18 in the circumferential direction 12, 14. The energy store 34 has multiple spring elements 36, preferably helical springs, which are arranged in the accommodating space 24 and which are arranged between the primary and secondary drivers 26, 32 as viewed in the circumferential direction 12, 14. The spring elements 36 are furthermore assigned multiple support or connecting shoes that are rotatable relative to the input or output side 16; 18, wherein, in FIG. 1, there is indicated by way of example a slide shoe 38 which serves for the sliding support of the spring element 36, to the outside in the radial direction 8, on the delimiting wall, which delimits the accommodating space 24 to the outside in the radial direction 8, of the primary element 20. Moreover, the connecting shoes may serve for the connection of two or more spring elements 36 of the energy store 34, wherein connecting shoes have been omitted from the illustration for improved clarity.

Figure 2:
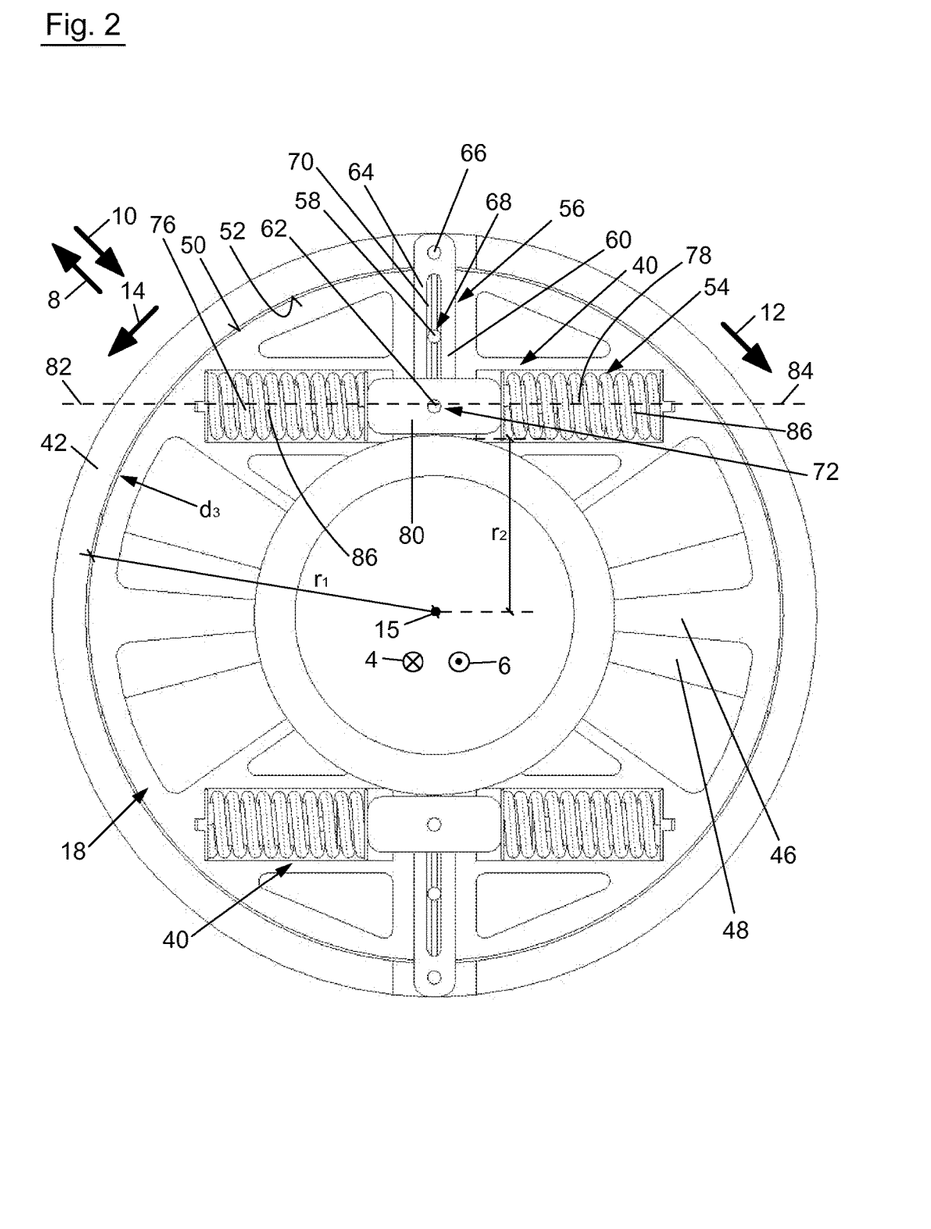
FIG. 2 shows a partial front view of the output side of the torsional vibration damper from FIG. 1.
Figure 4:
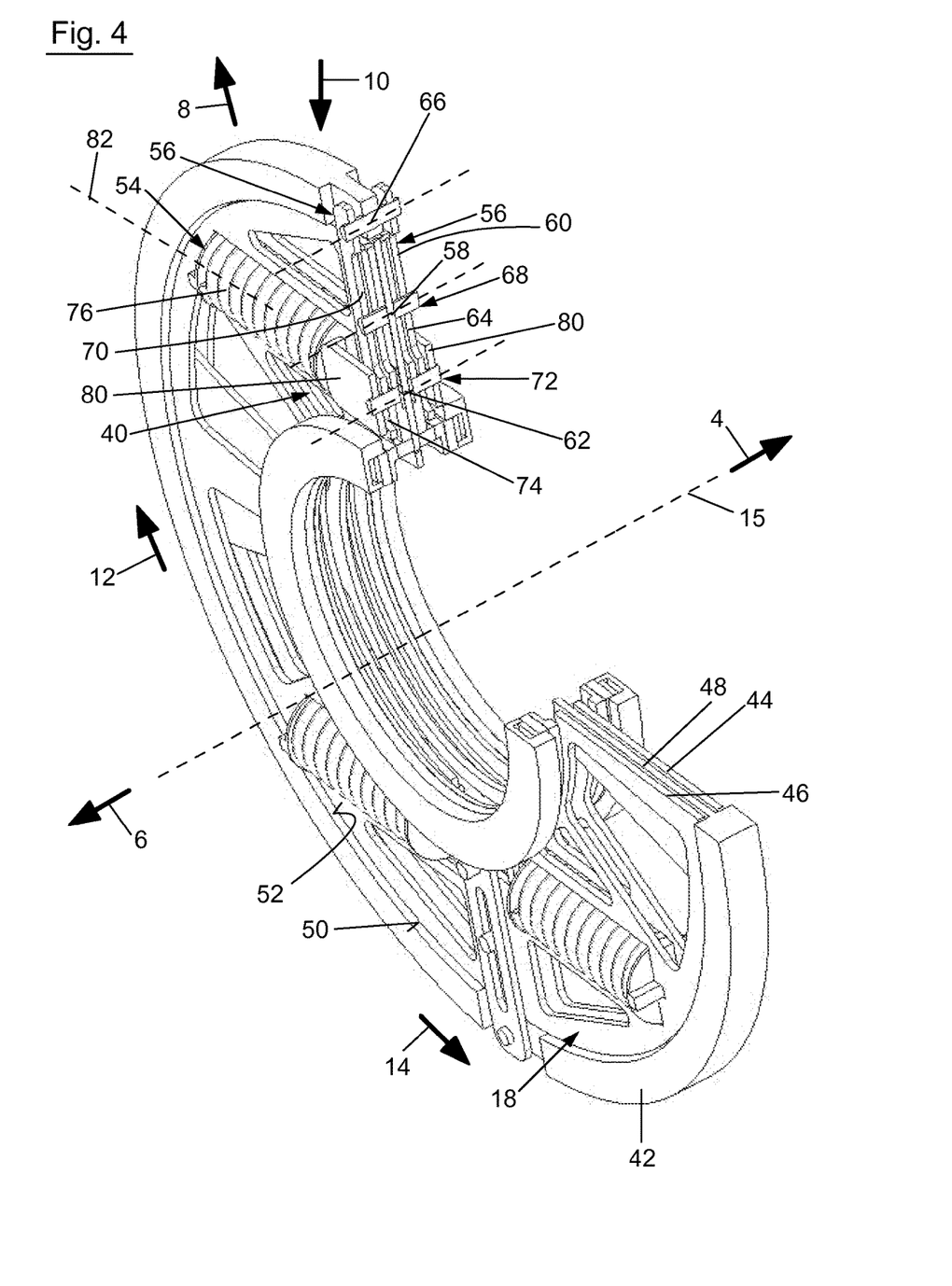
FIG. 4 is a perspective illustration of the output side from FIGS. 2 and 3 in a partially sectional illustration.
Figure 5:
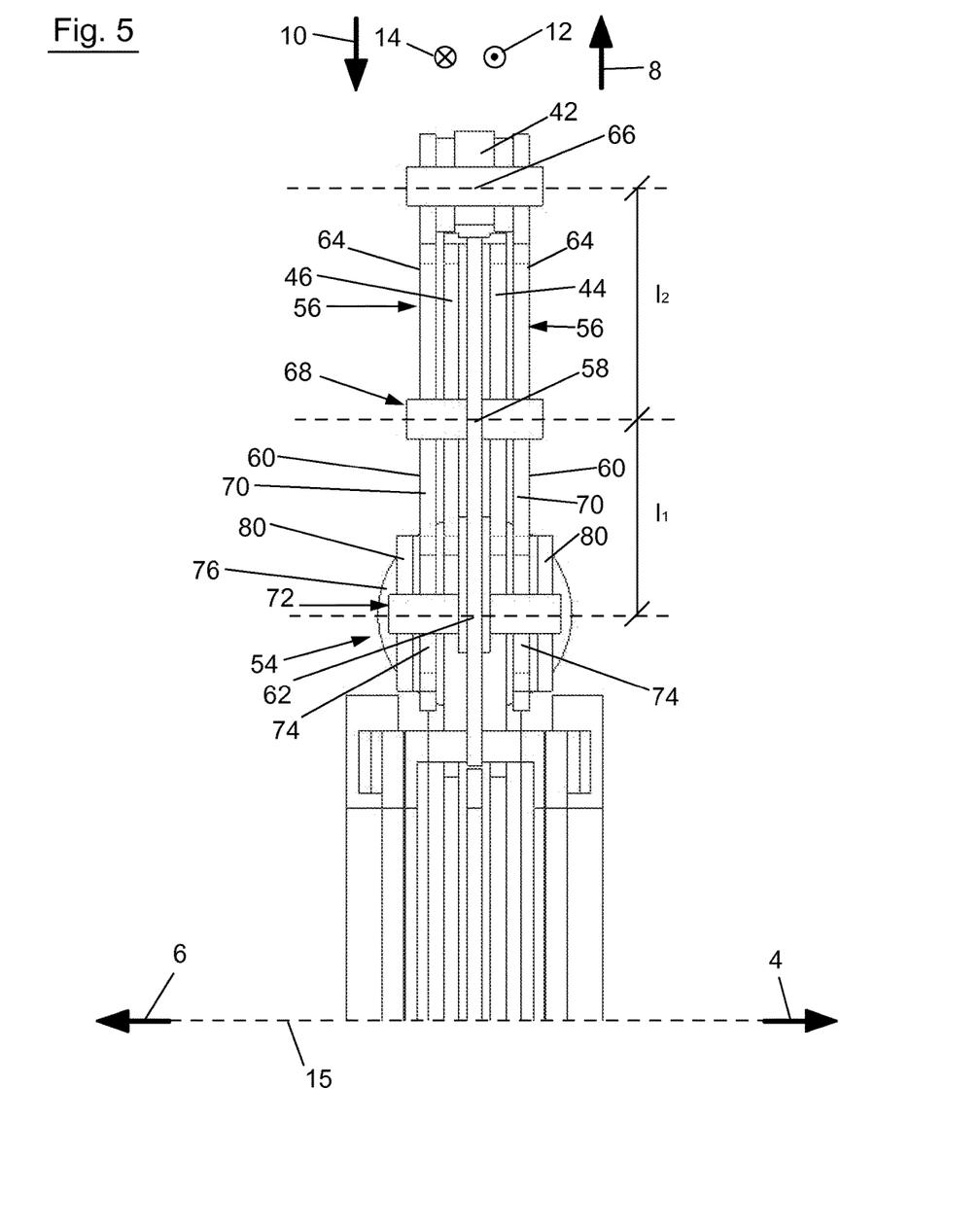
FIG. 5 shows a side view of the output side from FIGS. 2 to 4 of the torsional vibration damper in a sectional illustration.

On the output side 18 of the torsional vibration damper 2 there is arranged a mass part 42 which is rotatable relative to the output side 18 in the circumferential direction 12, 14 counter to the restoring force of a restoring apparatus 40, which mass part can also be referred to as inertial part or inertial mass part. The mass part 42 is arranged outside the accommodating space 24 accommodating the energy store 34, is of annular form, that is to say is formed in an annularly encircling manner in the circumferential direction 12, 14, and is arranged outside the output side 18 as viewed in the radial direction 8. As can be seen from FIG. 1 and from the following FIGS. 2 and 4, two restoring apparatuses 40, 40 are provided, wherein the restoring apparatuses 40, 40 will be described below merely with reference to one of the restoring apparatuses 40, and the description applies equally to both restoring apparatuses 40, 40.

The output side 18 has two disks 44, 46 which are connected rotationally conjointly to one another and which are spaced apart from one another in the axial direction 4, 6 and which extend substantially in the radial directions 8, 10. Here, the disk 44 may as illustrated in FIG. 1 be formed for example by the above-mentioned secondary element 28 or by a section thereof. It is however alternatively likewise possible for the disk 44 to be formed separately from the secondary element 28, and for the disk 44 to be connected rotationally conjointly to the secondary element 28. As can be seen in particular from FIGS. 2 to 5, windows or cutouts may be provided in the disks 44, 46 in order to reduce the weight of said disks but nevertheless ensure a high stiffness of said disks by way of the spokes or struts formed between the windows or cutouts. The disk 46 and thus the output side 18 can be or is supported on the input hub 30 at a diameter $d_1$.

The mass part 42 is connected rotationally conjointly to a disk-shaped support part 48. The disk-shaped support part 48, which in turn may have a multiplicity of windows or cutouts, has a smaller extent in the axial direction 4, 6 than the mass part 42 and extends inward in the radial direction 10 from the mass part 42, wherein the disk-shaped support part 48 is arranged between the disks 44, 46 of the output side 18 as viewed in the axial direction 4, 6. The support part 48 serves for the indirect support of the mass part 42 at the inside in the radial direction 8, 10. Accordingly, the support part 48 is or can be supported at the inside in the radial direction 8, 10 in the region of a diameter $d_2$ in order to indirectly support the mass part 42 at the inside in the radial direction 8, 10, wherein here, the support is realized on the input hub 30. Alternatively, however, the support at the inside in the radial direction 8, 10 may also be realized on the output side 18. The diameter $d_2$ is smaller than the greatest outer diameter $d_3$ of that side 50 of the output side 18 which faces outward in the radial direction 8 toward the mass part 42. Also, the diameter $d_2$ substantially corresponds to the diameter $d_1$ mentioned above, such that the support part 48 is or can be supported at the inside in the radial direction 8, 10 substantially in the region of the same diameter $d_1$ as the output side 18. Here, a plain bearing is preferably formed between the support part 48 and the input hub 30, or alternatively the output side 18. Owing to the relocation of the diameter $d_2$ to the inside in the radial direction 10 proceeding from the diameter $d_3$, the friction forces occurring here are however low, wherein the manufacture of a plain bearing of said type is also simplified. It is however alternatively also possible here for a radial bearing to be provided which is not in the form of a plain bearing but is for example in the form of a rolling bearing.

It can be seen from FIG. 1 that the support of the mass part 42 on the support part 48 is realized with a spacing between that side 52 of the mass part 42 which faces inward in the radial direction 10 and that side 50 of the output side 18 which faces outward in the radial direction 8 toward the mass part 42, such that no support and/or friction are generated here. Moreover, the mass part 42 can be or is supported at the inside in the radial direction 8, 10 exclusively via the support part 48.

The restoring apparatus 40 will be described in more detail below with reference to FIGS. 2 to 5. The restoring apparatus 40 is composed substantially of a spring device 54 for generating an actuating force and of a pivotable lever element 56. The lever element 56, which is in the form of a flexurally rigid or non-flexible lever element 56, extends substantially in the radial direction 8, 10 in the initial position shown in FIGS. 2 to 5. The lever element 56 has an articulation point 58 at which the lever element 56 is pivotably articulated on the output side 18. A first lever section 60 extends between an actuating force action point 62, at which the actuating force of the spring device 54 acts and about which the lever element 56 is pivotable, and the articulation point 58, wherein the first lever section 60 extends inward in the radial direction 10 proceeding from the articulation point 58. Furthermore, the lever element 56 has a second lever section 64 which extends outward in the radial direction 8 proceeding from the articulation point 58 to a restoring force action point 66. Here, the first lever section 60 has a length $l_1$, whereas the second lever section 64 has a length $l_2$. At the restoring force action point 66, the lever element 56 is connected to the mass part 42 such that the restoring force is transmitted to the mass part 42 via the restoring force action point 66, and the lever element 56 is pivotable about the restoring force action point 66. The lever ratio of the lever element 56 is thus $l_1/l_2$, meaning $l_1$ divided by $l_2$. An actuating force exerted on the actuating force action point 62 by the spring device 54 can be transmitted to the mass part 42 via the lever element 56 so as to generate the restoring force, acting via the restoring force action point 66, on the mass part 42. The corresponding lever ratio $l_1/l_2$ may however be varied by adjustment and/or displacement of the articulation point 58 in the radial direction 8 or 10. For this purpose, a projection 68 protruding in the axial direction 4, 6 is provided on the output side 18, which projection extends, so as to form the articulation point 58, in an elongate guide 70 of the lever element 56, wherein the projection 68 is arranged on the output side 18 so as to be adjustable or displaceable in the radial direction 8, 10 for the purposes of varying the lever ratio $l_1/l_2$. It is consequently possible for the restoring apparatus 40 to be adjusted in this case in continuously variable fashion with variation of a restoring force characteristic curve, to be described in more detail below with reference to FIG. 7, of the restoring force acting on the mass part 42 at the restoring force action point 66.

The mass part 42 can be rotated relative to the output side 18 while maintaining a predetermined radial spacing $r_1$ to the axis of rotation 15 of the output side 18 of the torsional vibration damper 2. To permit this in the embodiment illustrated, the lengths 11 and $l_2$ of the lever sections 60, 64 can be varied, that is to say shortened or lengthened, by rotating the mass part 42 in the circumferential directions 12 and 14 relative to the output side 18, with the lever ratio $l_1$ divided by $l_2$ substantially being maintained. For this purpose, it is possible as already explained above for the articulation point 58 to be displaced relative to the lever element 56 by virtue of the projection 68 being guided displaceably in the guide 70 in the lever element 56. Furthermore, at least one of the two remaining points, that is to say either the restoring force action point 66 or the actuating force action point 62, is also displaceable relative to the lever element 56. In the example illustrated, the restoring force action point 66 is arranged immovably on the lever element 56, whereas the actuating force action point 62 can be displaced relative to the lever element 56 by rotating the mass part 42. To form the actuating force action point 62, there is in turn provided a projection 72 which protrudes in the axial direction 4, 6 and which is guided displaceably in a guide 74 in the lever element 56.

The spring device 54 has a first spring element 76 and a second spring element 78. The two spring elements 76, 78 are each in the form of compression springs in this case helical compression springs and act on the lever element 56 oppositely to one another via the projection 72 and thus in the region of the actuating force action point 62. The two spring elements 76, 78 however do not act directly on the projection 72, and instead act on both sides of a displaceable load-bearing part 80 on which the protruding projection 72 is arranged, said projection extending into the guide 74 on the lever element 56 so as to form the actuating force action point 62.

The lever element 56 is arranged in the initial position shown in the figures under preload of the first spring element 76 and of the second spring element 78. Accordingly, the two spring elements 76, 78 are each preloaded in the initial position, in which the spring elements 76, 78 are supported at one side on the output side 18 and at the other side on the load-bearing part 80 and thus on the lever element 56. The two spring elements 76, 78 extend in each case along a longitudinal axis 82, 84, said longitudinal axes being offset outward in the radial direction 8 in relation to the axis of rotation 15 and being arranged in a plane spanned by the radial directions 8, 10. Here, the longitudinal axes 82, 84 of the two spring elements 76, 78 extend along a common straight line, that is to say the two longitudinal axes 82, 84 are arranged in alignment with one another. Also, the longitudinal axes 82, 84 extend parallel to a radial line, extending in the radial directions 8, 10, of the output side 18 of the torsional vibration damper 2. Here, the longitudinal axes 82, 84 are offset outward in the radial direction 8 in relation to the axis of rotation 15, such that the spring elements 76, 78 are themselves spaced apart from the axis of rotation 15 in the radial direction 8, as indicated by the radial spacing $r_2$.

The two spring elements 76, 78 are furthermore each assigned a spring travel limiting means 86 for limiting the spring travel, which spring travel limiting means is, in the illustrated embodiment, arranged substantially in the spring interior space surrounded by the windings of the spring elements 76, 78 in the form of helical springs. The spring travel limiting means 86 limits the spring travel of the respective spring element 76, 78 such that the respective spring element 76, 78 is prevented from entering a blocked state, in which the mutually adjacent windings of the spring element 76, 78 adjoin one another or are supported on one another. Furthermore, the spring travel limiting means 86 limits the maximum rotational angle range of the mass part 42 relative to the output side 18.

Figure 3:
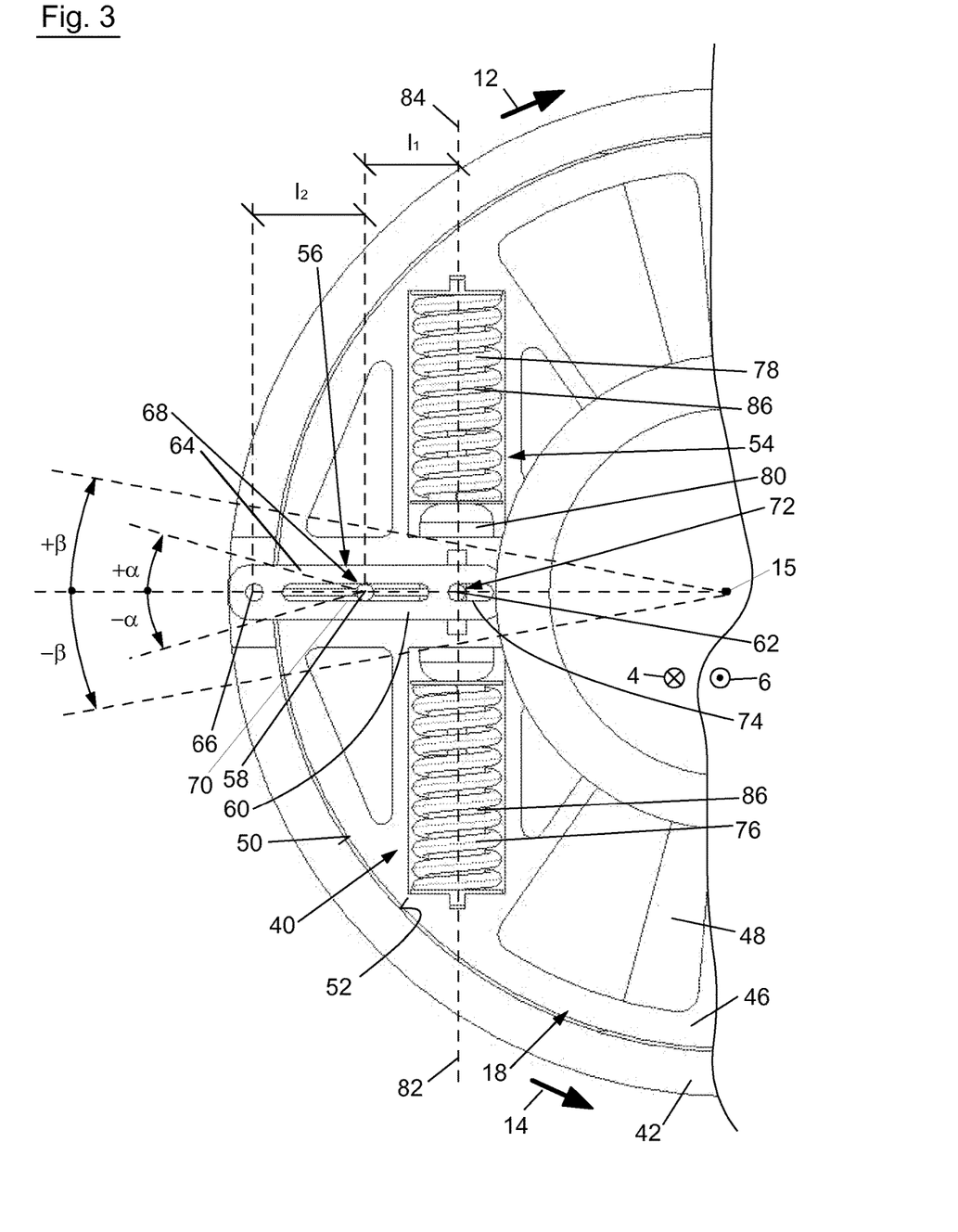
FIG. 3 shows a further partial front view of the output side of the torsional vibration damper from FIG. 1, with a part of the load-bearing part 80 omitted.
Figure 6:
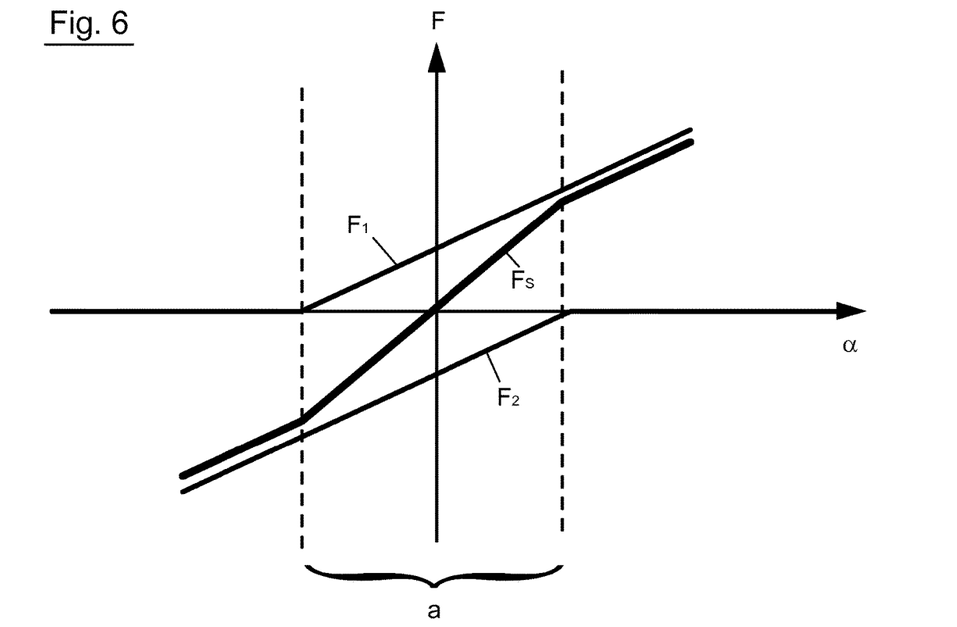
FIG. 6 is a diagram showing the actuating force characteristic curve of the spring device from FIGS. 1 to 5.

FIG. 6 shows a diagram in which the actuating force of the spring device 54 is plotted versus the rotational angle of the lever element 56 about the articulation point 58 proceeding from the initial position in FIG. 3. Accordingly, the illustration shows firstly the actuating force characteristic curve $F_1$ of the first spring element 76 and secondly the actuating force characteristic curve $F_2$ of the second spring element 78, which yield the actuating force characteristic curve $F_S$ of the spring device 54 as a whole. As can be seen from FIG. 6, based on the preload of the two spring elements 76, 78, an actuating force characteristic curve $F_S$ is obtained which has a steeper gradient in a rotational angle range a about the initial position, such that the stiffness of the spring device 54 is increased in said rotational angle range a.

Figure 7:
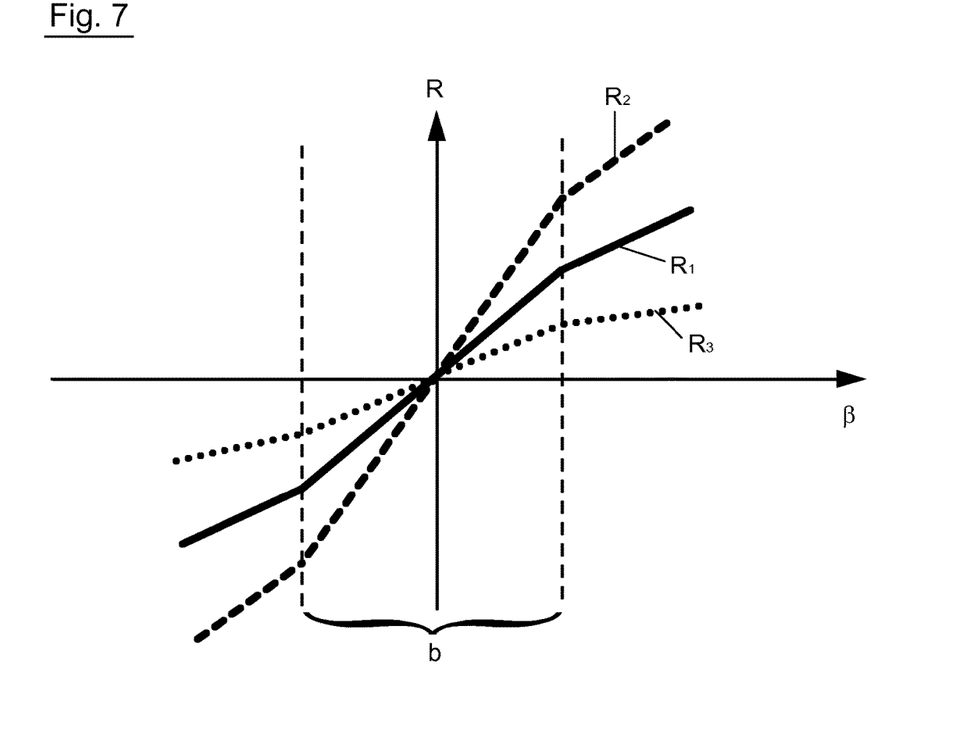
FIG. 7 is a diagram showing the restoring force characteristic curve of the restoring force acting on the mass part as per FIGS. 1 to 5.

For the restoring force that acts on the mass part 42 in the region of the restoring force action point 66, the result is a correspondingly configured restoring force characteristic curve $R_1$ indicated in FIG. 7, wherein, in FIG. 7, the restoring force R is plotted versus the rotational angle of the mass part 42 relative to the output side 18. The restoring force characteristic curve $R_1$ applies to the position of the articulation point 58 and of the protruding projection 68 as shown in the figures. To increase the stiffness of the spring device 54, the articulation point 58 can be adjusted or displaced outward in the radial direction 8 with an enlargement of the lever ratio $l_1/l_2$, such that the restoring force characteristic curve is varied. By means of said measure, the restoring force characteristic curve becomes the restoring force characteristic curve $R_2$ indicated by dashed lines in FIG. 7, which has a steeper gradient than the restoring force characteristic curve $R_1$ in all regions. By contrast, if it is sought to decrease the stiffness of the spring device 54, then the articulation point 58 is adjusted or displaced inward in the radial direction 10 proceeding from the position shown in the figures, such that the lever ratio $l_1/l_2$ is reduced and the restoring force characteristic curve corresponds to the restoring force characteristic curve $R_3$ indicated by dotted lines in FIG. 7.

The first and second spring elements 76, 78 are preferably preloaded such that they both exert a respective actuating force on the lever element 56 over the maximum rotational angle range of the mass part 42 relative to the output side 18. Consequently, the spring device 54 is operated exclusively in the above-mentioned rotational angle range a in FIG. 6, such that the restoring force R is also generated exclusively in the rotational angle range b, indicated in FIG. 7, of the mass part 42 relative to the output side 18. This may be realized by corresponding limitation of the rotational angle range a and/or b, wherein the above-mentioned spring travel limiting means 86 are preferably used for this purpose. It is however alternatively also possible for the lever element 56 to be arranged in the initial position of the lever element 56, as shown in the figures, without preload of the spring elements 76, 78 that act on the lever element 56 oppositely to one another.

Although not illustrated in any more detail in the figures, the restoring apparatus 40 or the articulation point 58 thereof is preferably automatically adjustable as a function of the operating state, possibly a rotational speed, of an associated drive unit or of an associated internal combustion engine. Here, the restoring apparatus 40 is particularly preferably adjustable automatically into a starting position as a result of deactivation of the internal combustion engine, and adjustable automatically, after the starting of the internal combustion engine, into a position deviating from the starting position.

Figure 8:
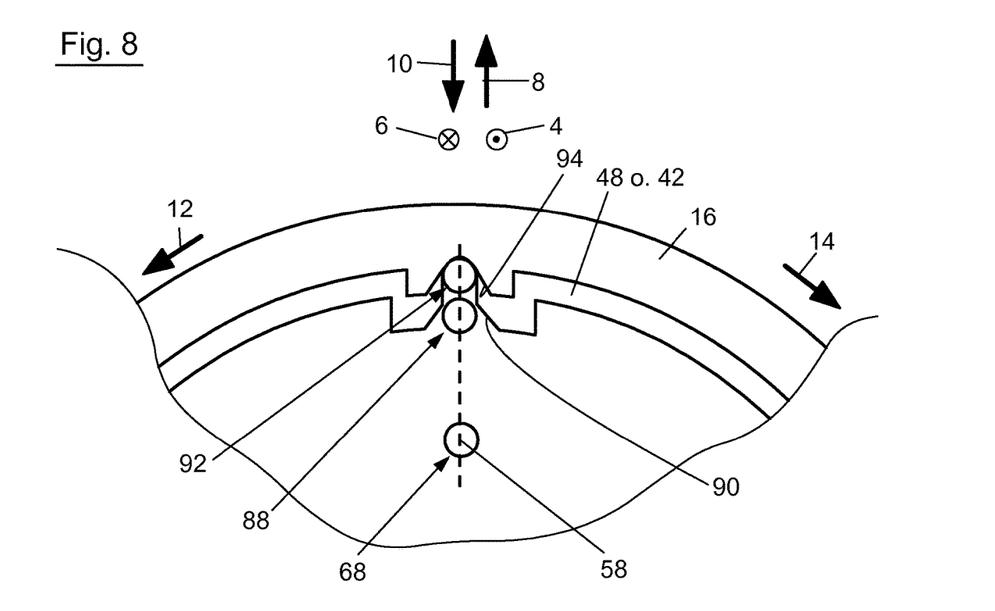
FIG. 8 shows a partial front view of the torsional vibration damper from the preceding figures in the region of the articulation point.

FIG. 8 shows a further feature of the torsional vibration damper 2. The restoring apparatus 40, which in FIG. 8 is indicated merely on the basis of the projection 68 for forming the articulation point 58, can be adjusted into a first position 88 in which the restoring apparatus 40 interacts with the mass part 42, in this case via the support part 48, so as to prevent, preferably by way of positive locking, a rotation of the mass part 42 relative to the output side 18. In the specific embodiment, the projection 68 is arranged in the first position 88 in a receptacle 90 on the support part 48, and thereby prevents a rotation of the mass part 42 relative to the output side 18 in the circumferential directions 12, 14.

Furthermore, the restoring apparatus 40 can be adjusted into a second position 92 in which the restoring apparatus 40 interacts with the mass part 42, in this case via the support part 48, so as to prevent, preferably by way of positive locking, a rotation of the mass part 42 relative to the output side 18 and a rotation of the input side 16 relative to the output side 18. In the specific embodiment, the projection 68, when in the second position 92, is arranged both in the receptacle 90 and also in a receptacle 94 on the input side 16, and thereby additionally prevents a rotation of the input side 16 relative to the output side 18 in the circumferential directions 12, 14, such that this can also be referred to as bypassing of the energy store 34.

It is self-evident that the restoring apparatus 40 may also, by contrast to the illustration above, be adjustable merely into one of the two positions 88, 92, with the other of the two positions 88, 92 not being provided. It is also not necessary for the rotation to be prevented entirely in the positions 88, 92; it is rather also possible for the rotation to be hindered, preferably by frictional contact, and/or for the relative rotational angle range to be restricted or limited.

What is claimed is:

1. A torsional vibration damper having an input side, having an output side and having an energy store for a rotationally elastic coupling of the input and output sides in a circumferential direction, wherein, on the input or output side, there is arranged a mass part that is rotatable relative to the input or output side counter to a restoring force of a restoring apparatus, wherein the restoring apparatus has at least one pivotable lever element providing an actuating force to be transmitted to the mass part so as to generate the restoring force acting on the mass part, the lever element being pivotable about an articulation point which is adjustable or displaceable with variation of a lever ratio of the lever element, wherein the energy store has multiple support shoes or connecting shoes which are rotatable relative to the input or output side and which serve for the support and connection of one or more spring elements of the energy store.

2. The torsional vibration damper as claimed in claim 1, wherein the restoring apparatus is adjustable, with continuous variation of a restoring force characteristic curve of the restoring force acting on the mass part.

3. The torsional vibration damper set forth in claim 2, wherein the restoring apparatus is adjustable into a position in which the restoring apparatus interacts with the mass part, via a support part, and with the output or input side while hindering, by frictional contact, or preventing, by positive locking, a rotation of the mass part and of the input or output side relative to the output or input side, wherein a displaceable or adjustable projection, which forms the articulation point, of the restoring apparatus interacts with the mass part and/or with the output or input side.

4. The torsional vibration damper as claimed in claim 2, wherein the restoring apparatus is adjustable automatically.

5. The torsional vibration damper as claimed in claim 1, wherein the mass part is rotatable relative to the input or output side while maintaining a predetermined radial spacing to the axis of rotation of the input or output side.

6. The torsional vibration damper as claimed in claim 1, wherein the lever element has a first lever section between an actuating force action point and the articulation point and has a second lever section between the articulation point and a restoring force action point, the lengths of which lever sections can be varied by rotation of the mass part relative to the input or output side, with the lever ratio being substantially maintained, wherein the articulation point is displaceable relative to the lever element with variation of the lengths of the lever sections and one of the actuating force action point or the restoring force action point is displaceable relative to the lever element with variation of the lengths of the lever sections, and the actuating force action point or the restoring force action point remaining is arranged immovably on the lever element.

7. The torsional vibration damper as set forth in claim 1, wherein the mass part is arranged outside an accommodating space accommodating the energy store, is of annular form and is arranged outside the input or output side in the radial direction.

8. A torsional vibration damper as set forth in claim 1, wherein the articulation point is adjustable or displaceable in a radial direction with variation of the lever ratio of the lever element.

9. The torsional vibration damper as claimed in claim 1, wherein the input side comprises a first element and the output side comprises a second element, and wherein the first element is axially spaced from the second element.

10. A torsional vibration damper having an input side, having an output side and having an energy store for a rotationally elastic coupling of the input and output sides in a circumferential direction, wherein, on the input side or the output side, there is arranged a mass part that is rotatable relative to the input or output side counter to a restoring force of a restoring apparatus, wherein the restoring apparatus has at least one pivotable lever element providing an actuating force to be transmitted to the mass part so as to generate the restoring force acting on the mass part, the lever element being pivotable about an articulation point which is adjustable or displaceable with variation of a lever ratio of the lever element, and wherein the restoring apparatus has a spring device for generating the actuating force, the spring device having a first spring element and a second spring element which act on the lever element oppositely to one another and which are in the form of helical compression springs, wherein the first spring element and the second spring element extend along a common longitudinal axis.

11. The torsional vibration damper as claimed in claim 10, wherein the lever element is arranged in an initial position under preload of the first and second spring elements, the first and second spring elements being preloaded such that they both exert a respective actuating force on the lever element over the maximum rotational angle range of the mass part.

12. The torsional vibration damper as claimed in claim 10, wherein the first spring element and the second spring element each have a longitudinal axis which is offset radially outward in relation to the axis of rotation of the input or output side, the longitudinal axes extending along a common straight line or parallel to a radial line or the spring elements particularly being spaced apart from the axis of rotation in a radial direction.

13. The torsional vibration damper as claimed in claim 10, wherein the first spring element or the second spring element is assigned a spring travel limiting means for limiting the spring travel.

14. The torsional vibration damper as claimed in claim 10, wherein the lever element is arranged in an initial position without preload of the spring elements that act on the lever element oppositely to one another.

15. A torsional vibration damper having an input side, having an output side and having an energy store for a rotationally elastic coupling of the input and output sides in a circumferential direction, wherein, on the input or output side, there is arranged a mass part that is rotatable relative to the input or output side counter to a restoring force of a restoring apparatus, wherein the restoring apparatus has at least one pivotable lever element providing an actuating force to be transmitted to the mass part so as to generate the restoring force acting on the mass part, the lever element being pivotable about an articulation point which is adjustable or displaceable with variation of a lever ratio of the lever element; and wherein at least one support part is provided which is connected rotationally conjointly to the mass part and which, supporting the mass part at an inside in a radial direction, is supported in a region of a diameter which is smaller than a greatest outer diameter of that side of the input or output side which faces outward toward the mass part in the radial direction, which support part is supported at the inside in the radial direction in a region of the same diameter as the input or output side, the support part being of disk-shaped form, at least partially having a smaller extent in an axial direction than the mass part, and being arranged between two disks of the input or output side as viewed in the axial direction.

16. The torsional vibration damper as claimed in claim 15, wherein the support by the support part is realized with a spacing between that side of the mass part which faces inward in the radial direction and that side of the input or output side which faces outward in the radial direction toward the mass part, the mass part being supported at the inside in the radial direction exclusively via the support part.

* * * * *